2,798,062

LOW MOLECULAR WEIGHT HETEROPOLYMERS OF STYRENE AND ALKYL ESTERS OF MALEIC ACID AND PROCESS FOR PREPARING THE SAME

Leo L. Contois, Jr., Springfield, Mass., assignor to Monsanto Chemical Company, St. Louis, Mo., a corporation of Delaware No Drawing. Application November 13, 1953, Serial No. 392,033

6 Claims. (Cl. 260—78.5)

This invention relates to a process for preparing heteropolymers of styrene and alkyl half esters of maleic acid. More particularly, this invention relates to a process for preparing low molecular weight heteropolymers of styrene and alkyl half esters of maleic acid which can be used to prepare high-solids low-viscosity solutions.

Heteropolymers of styrene and alkyl half esters of maleic acid are soluble in many organic solvents and, in the form of the soluble salts thereof, are sparingly soluble in water. The characteristics of solutions of the heteropolymers are largely determined by the molecular weight of the heteropolymer. Thus, for a given solids concentration, the viscosity of an aqueous solution of heteropolymer salt will increase as the molecular weight of the heteropolymer increases. Furthermore, the solubility of the heteropolymer salts decreases as molecular weight increases. Heteropolymers prepared by conventional polymerization processes, in the form of the salts thereof, can be used to prepare aqueous solutions comprising about 5–10% by weight of heteropolymer salt. Low solids solutions of this nature are advantageously used for many purposes. However, it is frequently desirable to use low-viscosity high-solids solutions of heteropolymer salt and conventional heteropolymers have not been entirely satisfactory for use in this situation. Particular difficulty has been encountered in preparing heteropolymers of styrene and alkyl half esters of maleic acid for use as emulsion wax additives, latex stabilizers, film-forming materials, etc.

Accordingly, an object of the present invention is the provision of a process for the preparation of low molecular weight heteropolymers of styrene and alkyl half esters of maleic acid.

Another object is the provision of a process for the preparation of low molecular weight heteropolymers of styrene and alkyl half esters of maleic acid which, in the form of the water-soluble salts thereof, can be used to form low-viscosity, high-solids aqueous solutions.

A further object is the provision of low molecular weight heteropolymers of styrene and alkyl half esters of maleic acid.

These and other objects are attained by copolymerizing styrene and an alkyl half ester of maleic acid as hereinafter defined in mass in accordance with a process wherein a mixture of styrene and half ester is rapidly heated to a temperature of at least about 100° C. in order to initiate a polymerization reaction and wherein the polymerization reaction is completed at a temperature of more than 100° C. at 5–10% per minute polymerization rate.

The following examples are given in illustration and are not intended as limitations on the scope of this invention. Where parts are mentioned, they are parts by weight.

Example 1

Prepare the amyl half ester of maleic acid by reacting 100 parts of maleic acid with about 10 parts of amyl alcohol at a temperature of about 80–85° C. with constant agitation until the reaction mixture reaches a substantially constant acid value, as determined by titration. This normally requires about 2½ hours.

Place the amyl half ester in a suitable reaction vessel fitted with a reflux condenser and an agitator, and add thereto a solution of about 0.4 part of beta-nitrostyrene, about 5 parts of n-dodecyl mercaptan and about 1 part of ditertiary butyl peroxide in 100 parts of monomeric styrene. With continuous agitation, heat the resultant solution to a temperature of about 120° C. in less than 20 minutes. Discontinue the heating at this temperature but continue the agitation. An exothermic polymerization reaction commences at a temperature of about 60° C. and continues after the heating is discontinued. The temperature continues to rise and after about 10 minutes peaks at a temperature above 200° C., at which time the polymerization reaction is substantially complete. Vigorous refluxing of the unreacted styrene monomer occurs during the polymerization reaction.

The temperature drops off rapidly after peaking. When the temperature has dropped to about 165–175° C., pour the fluid reaction product into cooling trays where it solidifies to give a reaction product consisting essentially of a heteropolymer of styrene and the amyl half ester of maleic acid.

Mix about 1 part of the reaction product with 100 parts of water and slowly add a concentrated solution of ammonium hydroxide to the mixture until substantially all of the reaction product is dissolved and the resultant solution has a pH of about 8. The thus-prepared 1% solids solution has a viscosity of about 1–2 cps. When this procedure is repeated, using 20 parts of heteropolymer per 100 parts of water, the resultant 20% solids solution of the ammonium salt of the heteropolymer has a viscosity of about 50–60 cps. at a pH of about 8. An irreversible gel is formed on attempting to form a 25% solids solution of heteropolymer salt in this fashion.

When an equivalent amount of the 2-ethyl hexyl half ester of maleic acid is substituted for the above-described amyl half ester and Example I is otherwise repeated in the described manner, the reaction product consists essentially of a heteropolymer of styrene and the 2-ethylhexyl half ester of maleic acid. A 1% solids aqueous ammoniacal solution of this heteropolymer will have a viscosity of about 1–2 cps. at a pH of about 8 and a 20% solids solution will have a viscosity of about 80–100 cps. at a pH of about 8. An irreversible gel will be formed on attempting to form a 25% solids solution.

When an equivalent amount of a mixture of 75% secondary butyl half esters of maleic acid and about 25% half methyl ester of maleic acid is substituted for the amyl half ester and Example I is otherwise repeated in the described manner, the reaction product consists essentially of a heteropolymer of styrene and the sceondary butyl and methyl half esters of maleic acid. A 1% solids aqueous solution of the ammonium salt of this heteropolymer will have a viscosity slightly in excess of 1 centipoise at a pH of about 8 and a 20% solids solution of the ammonium salt will have a viscosity of about 35–40 cps. at a pH of about 8. An irreversible gel will be formed on attempting to form a 25% solids solution.

The 2-ethylhexyl half ester of maleic acid is conveniently prepared by reacting about 130 parts of 2-ethylhexanol with 100 parts of maleic anhydride at a temperature of about 80–85° C. with agitation for about 3 hours. Similarly, when about 55 parts of butanol and about 10 parts of methanol are reacted with 100 parts of maleic anhydride at a temperature of 80–85° C. with agitation for about 3 hours, a mixture of about 75% butyl half ester and about 25% methyl half ester of maleic acid is formed.

It is preferable to use chain transfer agents, chain terminating agents, or mixtures thereof, in order to obtain heteropolymers having the lowest molecular weight. However, it is not absolutely necessary to use such compounds and satisfactory results are obtained when the polymerization reaction is conducted in the absence of such compounds. This is illustrated by the following example:

*Example II*

Prepare a mixture of about 75% secondary butyl half ester and about 25% methyl half ester of maleic acid by reacting about 10 parts of methanol and about 55 parts of secondary butyl alcohol with 100 parts of maleic anhydride at a temperature of 80–85° C. with agitation for about 2½ hours.

Place the resultant mixture of half esters in a suitable reaction vessel fitted with a reflux condenser and an agitator. Add a solution of about 1 part of ditertiary butyl peroxide in 100 parts of monomeric styrene. Heat the resultant solution to a temperature of about 120° C. in less than 20 minutes with continuous agitation and then discontinue the heating. Agitation should not be interrupted until the reaction is complete. An exothermic polymerization reaction commences at a temperature of about 60° C. and the reaction continues after heating is discontinued. The temperature continues to rise and after about 10 minutes, peaks at a temperature above 200° C., at which time the polymerization reaction is substantially complete. Vigorous refluxing of the styrene monomer occurs during the reaction. The temperature drops off rapidly after peaking. When the temperature has dropped to 165–175° C., pour the fluid reaction product into cooling trays where it solidifies to give a reaction product consisting essentially of a heteropolymer of styrene and the secondary butyl and methyl half esters of maleic acid.

Mix about 1 part of the reaction product with 100 parts of water and slowly add a concentrated solution of ammonium hydroxide to the mixture until substantially all of the reaction product has dissolved and the resultant solution has a pH of about 8. The thus-prepared 1% solids solution has a viscosity of about 4–6 cps. When this procedure is repeated, using 20 parts of heteropolymer per 100 parts of water, the resultant 20% solids solution of the ammonium salt of the heteropolymer has a viscosity of about 100–200 cps. at a pH of about 8. An irreversible gel is formed on attempting to form a 25% solids solution of heteropolymer salt in this fashion.

*Example III*

Prepare a mixture of about 50% 2-ethylhexyl half ester and about 50% methyl half ester of maleic acid by reacting about 65 parts of 2-ethylhexanol and about 20 parts of methanol with 100 parts of maleic anhydride at a temperature of 80–85° C. with agitation for about 2½ hours. Add to the half esters thus prepared a solution of about 0.4 part of beta-nitrostyrene, about 5 parts of n-dodecyl mercaptan and about 1 part of ditertiary butyl peroxide in 100 parts of monomeric styrene. Seal the resultant solution in a suitable pressure vessel. Heat the solution to a temperature of about 120° C. within 20 minutes and then discontinue heating. During the heating period, an exothermic polymerization reaction is initiated and this reaction continues after heating is discontinued. Internal pressure will rise to about 100 p. s. i. The reaction temperature will continue to rise after heating is discontinued and will peak at a temperature above 200° C. within about 10 minutes after external heating is discontinued. After peaking, the temperature drops off rapidly. When the temperature has dropped to about 165–175° C., remove the seal from the pressure vessel and pour the fluid reaction product into cooling trays. It solidifies to give a reaction product consisting essentially of a heteropolymer of styrene and the 2-ethylhexyl and methyl half esters of maleic acid.

Mix about 1 part of the reaction product with 100 parts of water and slowly add a concentrated solution of ammonium hydroxide to the mixture until substantially all of the reaction product is dissolved and the resultant solution has a pH of about 8. The thus-prepared 1% solids solution has a viscosity of about 1–2 cps. When this procedure is repeated using 20 parts of heteropolymer per 100 parts of water, the resultant 20% solids solution of the ammonium salt of the heteropolymer has a viscosity of about 50–60 cps. An irreversible gel is formed on attempting to form a 25% solids solution of heteropolymer in this fashion.

The alkyl half esters of maleic acid to be reacted with styrene in accordance with the present invention are the unsubstituted and halogen-substituted saturated $C_1$ to $C_8$ alkyl half esters of maleic acid. The half esters are easily prepared by reacting maleic acid, preferably in the form of the anhydride, with an equimolar amount of a monohydric alcohol or of a mixture of monohydric alcohols. Representative monohydric alcohols that can be combined with maleic acid or maleic anhydride to form the desired half esters are methanol, ethanol, 2-chlorethanol, 2-bromoethanol, propanol, isopropanol, butanol, secondary butyl alcohol, amyl alcohol, isoamyl alcohol, 2-methyl butanol, 2-chlorobutanol, 1-methyl butanol, hexanol, methylbutyl carbinol, ethylpropyl carbinol, dimethylisopropyl carbinol, heptyl alcohol, dipropyl carbinol, diisopropyl carbinol, triethyl carbinol, pentamethyl ethanol, octanol, etc. The halogen-substituent may be chlorine, fluorine, bromine or iodine. From 1 to 2 mols of styrene should be used for each mol of half ester and, for best results, it is preferable to use about 1½ mols of styrene for each mol of half ester.

The low molecular weight heteropolymers of the present invention are prepared by rapidly heating a mixture of styrene and an unsubstituted or halogen-substituted saturated $C_1$ to $C_8$ alkyl half ester of maleic acid to a temperature of at least 100° C. in order to initiate a polymerization reaction and then completing the polymerization reaction at a temperature of more than 100° C. at a 5–10% per minute polymerization rate. The use of diluents and solvents is to be avoided if a homogeneous reaction product consisting essentially of heteropolymer is to be obtained.

Reaction at temperatures below 100° C. should be minimized. At atmospheric pressure, the monomers will begin to react at a temperature of about 60° C. As the pressure is increased, there will be a corresponding decrease in the temperature at which the reaction will begin. At temperatures below 100° C., the reaction is comparatively slow and low temperature reaction can therefore be minimized by heating the monomer mixture to a temperature of 100° C. or higher as rapidly as possible. The heating step should be completed within less than about 30 minutes. It is preferable to raise the temperature rapidly to about 110–125° C. before discontinuing external heating.

After external heating is discontinued, it is preferable to approximate an adiabatic reaction as closely as possible. Under such conditions, the styrene and half ester will react vigorously, the vigor of the reaction increasing as the temperature increases. The temperature of the reaction will continue to increase until substantially all of the monomeric materials have reacted, at which time the temperature will begin to fall off. The maximum temperature is usually about 200–225° C. Once the temperature has peaked, the use of substantially adiabatic reaction conditions may be discontinued and, if desired, external cooling may be used. However, it is usually satisfactory to permit the temperature to subside of its own accord, the cooling being accelerated by pouring the reaction product into cooling trays when the temperature has dropped to about 165–175° C. The heteropolymers solidify at temperatures below about 160° C.

The polymerization reaction should be conducted at a

5–10% per minute polymerization rate to insure the formation of a homogeneous reaction product consisting essentially of heteropolymer. In other words, the reaction should be conducted in a manner such that the temperature will reach a peak within about 10–20 minutes after the monomer mixture has been brought to a temperature of about 100° C. In order to complete the reaction wtihin this time, a relatively large amount of a water-insoluble polymerization catalyst should be used to accelerate the reaction. A polymerization catalyst which is soluble in the monomers should be used. The operable catalysts are, generally speaking, the water-insoluble polymerization catalysts. Among the water-insoluble catalysts that may be used, alone or in admixture, are benzoyl peroxide, lauroyl peroxide, diethyl peroxide, acetyl peroxide, tertiary butyl peroxide, ditertiary butyl peroxide, ditertiary butyl perbenzoate, ditertiary amyl peroxide, diethyl peroxide, diazoaminobenzene, a,a'-azobis isobutyronitrile, etc. From about 0.5 to 1.5 parts of catalyst should be used for each 100 parts of monomeric styrene. For best results, it is preferable to use about 1 part of catalyst per 100 parts of styrene. Although larger amounts of catalyst may be used, no substantial improvement in reaction rate is effected.

As has been indicated, it is preferable to use chain transfer agents, chain terminating agents or mixtures thereof in order to more effectively obtain lower molecular weight products. Any of the conventional chain transfer agents or chain terminating agents may be used, numerous examples being known to those skilled in the art. Among the more effective materials of this nature are aromatic nitro compounds of the class disclosed in U. S. Patent No. 2,537,015 to Barrett. Such compounds have the structural formula $R_1CH-C(R_2)NO_2$ wherein $R_1$ represents an aromatic radical and $R_2$ represents hydrogen or a monovalent hydrocarbon radical. Such compounds may be used in amounts varying from about 0.1 to 1 part per 100 parts of styrene. Representative of the aromatic nitro compounds that may be used are 1-phenyl-2-nitro ethylene (beta-nitrostyrene), 1-vanillyl-2-nitroethylene, 1 - anisyl - 2 - nitroethylene, 1-orthochlorphenyl-2-nitroethylene, etc. Other compounds such as $C_5$ to $C_{20}$ mercaptans may be used if desired. It is preferable to use a $C_{12}$ to $C_{15}$ mercaptan. Illustrative of the mercaptans that may be used are isohexyl mercaptan, octadecyl mercaptan, n-dodecyl mercaptan, tertiary dodecyl mercaptan, etc. It is usually preferable to use about 3–7 parts of mercaptan per 100 parts of styrene. In accordance with a preferred form of the invention, a mixture of 3–7 parts of n-dodecyl mercaptan and about 0.3–0.5 part of beta-nitrostyrene is used for each 100 parts of styrene.

When the polymerization reaction is conducted at atmospheric pressure as in the case of Examples I and II, vigorous refluxing of the styrene monomer will occur and it is necessary to use a suitable reflux condenser and proper agitation. If the reaction be conducted under pressure as in Example III, refluxing of the styrene monomer is substantially eliminated. The reaction may be conducted in either a batchwise or continuous manner depending on the construction of the reaction vessel employed.

A substantially quantitative yield is obtained when the $C_1$ to $C_8$ alkyl half esters of the present invention are reacted with styrene in accordance with the process herein disclosed. Normally, the reaction product will comprise from 95 to 99.5% heteropolymer, the main contaminant being monomeric styrene. A 99% conversion is usually obtained. Moreover, the reaction product will comprise heteropolymers having a comparatively narrow range of molecular weights as shown by the uniform solubility characteristics of the reaction product. These factors are of importance because it is not reasonably practical to fractionate a mixture of heteropolymers of widely divergent molecular weights and because it is likewise impractical to purify the heteropolymer-containing reaction product. Thus, unreacted monomer, polymerization decomposition products, etc. will remain in the heteropolymer as contaminants and, if present in more than a minor amount, will substantially impair the utility of the heteropolymer.

As shown by the specific examples, the heteropolymers of the present invention, in the form of the salts thereof, can be used to prepare low-viscosity high-solids aqueous solutions. However, other organic and inorganic salts such as the alkali metal, alkaline earth metal, amine, quaternary ammonium, diethyl amine, triethyl amine, etc. salts may also be prepared by adding the heteropolymer to an aqueous solution of a water-soluble salt-forming base.

When the solids content of an aqueous solution of the ammonium salt of the heteropolymer is increased beyond about 20 parts of heteropolymer salt per 100 parts of water, the viscosity of the solution rapidly increases as each additional part of heteropolymer is added. An irreversible gel is usually formed at a solids content of about 25%. Aqueous solutions of heteropolymer salt containing more than about 20% solids are relatively unstable and tend to gel. Accordingly, for most practical purposes, the solids content of an aqueous solution of the ammonium salt of the heteropolymer should not be more than about 20%.

At room temperature, the viscosities of 20% solids aqueous solutions of ammonium salts of heteropolymers of the present invention will generally vary from a low of about 25–50 cps. to a high of about 600 cps. When the polymerization between styrene and the alkyl half ester of maleic acid is conducted in the presence of a suitable mixture of an aromatic nitro compound and a $C_5$ to $C_{20}$ mercaptan, a 20% solids aqueous solution of the ammonium salt of the resultant heteropolymer will usually have a viscosity of less than about 300 cps. at room temperature. In accordance with a preferred form of the invention, such a mixture comprises beta-nitrostyrene and a $C_{12}$ to $C_{15}$ mercaptan. When such is the case, a 20% solids aqueous solution of the ammonium salt of the resultant hereteropolymer will generally have a viscosity of less than about 100 cps. If the polymerization reaction is conducted in the absence of chain transfer and chain terminating agents, a 20% solids aqueous solution of the ammonium salt of the resultant heteropolymer will normally have a viscosity of about 400–600 cps. The average will be about 500 cps. For all practical purposes, such solutions may be considered free-flowing.

The heteropolymers of the present invention are soluble in a wide variety of organic solvents such as lower aliphatic alcohols, acetone, methylethyl ketone, xylene-alcohol mixtures, etc. Generally speaking, the heteropolymers are much more soluble with respect to organic solvents than with respect to water. For example, the heteropolymers of styrene and 75% secondary butyl and 25% methyl half esters of maleic acid (Example I) can be used to prepare a highly viscous free-flowing 90% solids solution in ethanol.

The low molecular weight heteropolymers of the present invention, in the form of high-solids aqueous solutions of the salts thereof, are useful for a wide variety of purposes. When a small amount of such a solution is incorporated into a conventional latex, such as a styrene-butadiene copolymer latex, the resultant composition has appreciably improved storage stability as compared to the unmodified latex. Emulsion wax formulations containing a small amount of an aqueous solution of a salt of a heteropolymer of the present invention can be used to form stronger and more durable coatings. High-solids solutions of heteropolymer salt can be used to form films by film-casting processes and the films thus-formed are appreciably stronger than films derived from heteropolymers prepared by conventional methods. The heteropolymers may also be used to prepare textile-treating agents, tanning agents, coating compositions, etc.

Aqueous heteropolymer salt solutions tend to increase in viscosity as the pH of the solution is increased. Moreover, highly alkaline solutions will frequently have an undesirable odor. Accordingly, for most purposes it is preferable that the aqueous solution of heteropolymer salt have a pH of about 8.

What is claimed is:

1. A process for preparing a low molecular weight heteropolymer which comprises rapidly heating a monomer mixture consisting of 1-2 mols of styrene and 1 mol of a half ester of maleic acid to a temperature of at least 100° C. within less than about thirty minutes and continuing the reaction above 100° C., thereby maintaining a 5-10 percent per minute polymerization rate, said half ester being taken from the group consisting of unsubstituted and halogen-substituted saturated $C_1$ to $C_8$ alkyl half esters of maleic acid and mixtures thereof, said process being carried out in the presence of 0.5-1.5 parts of a water-insoluble polymerization catalyst per 100 parts of styrene.

2. A process as in claim 1 wherein the monomer mixture contains from 0.1-3.7 parts per 100 parts of styrene of a chain transfer agent from the group consisting of aromatic nitro compounds and $C_5$ to $C_{20}$ aliphatic mercaptans and mixtures thereof.

3. A process as in claim 2 wherein the chain transfer agent is a mixture of beta-nitrostyrene and n-dodecyl mercaptan.

4. A process as in claim 1 wherein the half ester is the amyl half ester.

5. A process as in claim 1 wherein the half ester is the 2-ethyl hexyl half ester.

6. A process as in claim 1 wherein the half ester is a mixture of secondary butyl and methyl half esters.

References Cited in the file of this patent

UNITED STATES PATENTS

| | | |
|---|---|---|
| 2,640,819 | Barrett | June 2, 1953 |
| 2,658,057 | Park | Nov. 3, 1953 |

FOREIGN PATENTS

| | | |
|---|---|---|
| 663,841 | Great Britain | Dec. 27, 1951 |